United States Patent [19]
Chu

[11] Patent Number: 5,094,558
[45] Date of Patent: Mar. 10, 1992

[54] CLEANING APPARATUS

[75] Inventor: Tak Y. W. Chu, Kowloon, Hong Kong

[73] Assignee: Art Sea Development Corporation, Arcadia, Calif.

[21] Appl. No.: 628,929

[22] Filed: Dec. 12, 1990

Related U.S. Application Data

[63] Continuation of Ser. No. 393,144, Aug. 14, 1989, abandoned.

[51] Int. Cl.$^5$ .............................................. A46B 11/06
[52] U.S. Cl. ......................................... 401/42; 401/43; 401/46
[58] Field of Search ................................ 401/40–46

[56] References Cited

U.S. PATENT DOCUMENTS

| | | | |
|---|---|---|---|
| 1,147,667 | 7/1915 | Albright | 401/46 |
| 1,655,375 | 1/1928 | Kundel | 401/43 |
| 2,502,937 | 4/1950 | Franklin et al. | 401/45 X |
| 2,717,403 | 9/1955 | Batlas et al. | 401/46 X |
| 3,225,759 | 12/1965 | Drapen et al. | 401/40 X |
| 3,405,997 | 10/1968 | Diebold | 401/46 |
| 3,989,391 | 11/1976 | Thorner | 401/43 |
| 4,027,984 | 6/1977 | Underwood | 401/46 X |
| 4,575,270 | 3/1986 | Hammond | 401/43 X |

Primary Examiner—Steven A. Bratlie
Attorney, Agent, or Firm—Reese Taylor

[57] ABSTRACT

A cleaning apparatus is provided having a body portion and a cleaning member supported on the body portion, wherein a cleaning fluid container is situated within the body portion of the cleaning apparatus, and wherein the cleaning fluid exits the body portion, whereby cleaning fluid is dispensed from the container when necessary onto or adjacent the cleaning member. Such an arrangement is simple in design and construction, and since cleaning fluid is insitu, such provides an effective cleaning apparatus.

7 Claims, 3 Drawing Sheets

CLEANING APPARATUS

This application is a continuation of application Ser. No. 393,144, filed Aug. 14, 1989 now abandoned.

BACKGROUND OF THE INVENTION

This invention relates to a cleaning apparatus, and in particular a handheld cleaning apparatus.

Handheld brushes for use in baths are known, and such are used with a separate bar of soap in which to clean the user.

SUMMARY OF THE INVENTION

In accordance with the invention, a cleaning apparatus is provided having a body portion and a cleaning member supported on the body portion, wherein a cleaning fluid container is situated within the body portion of the cleaning apparatus, and wherein the cleaning fluid exits the body portion, whereby cleaning fluid is dispensed from the container when necessary onto or adjacent the cleaning member.

Such an arrangement is simple in design and construction, and since cleaning fluid is insitu, such provides an effective cleaning apparatus.

Suitably, the cleaning apparatus (e.g. a bath brush or car brush) is constructed in order for a flow of water to pass therethrough, and exit through the head thereof in order to enhance the cleaning effect of the apparatus.

Advantageously, the arrangement is such that the flow of water through the apparatus causes cleaning fluid to be forced out of the device when necessary. In particular, the pressure of the water passing through the article is allowed to act against a piston member provided in the cleaning fluid container in order to force cleaning fluid therefrom and out of the body of the cleaning apparatus.

Suitably, the water enters the cleaning apparatus at the outer end of the handle, whereupon it passes through the handle and out of the head portion of the device. At a point intermediate thereof, the water acts against the piston member which is movable within the cleaning fluid compartment, and upon opening of an exit of the cleaning fluid compartment by a plunger or the like, cleaning fluid can exit the cleaning fluid compartment due to the pressure of water being forced against the piston, and forcing cleaning fluid out of the exit of the cleaning fluid compartment. As soon as the plunger or the like is closed, the cleaning fluid cannot escape from the exit of the cleaning fluid compartment even though a pressure is being exerted on the piston member by the water acting thereupon.

Suitably, the water can exit the head either from a spray head and/or from the outer edges of the head, and a control device in this respect is provided.

DESCRIPTION OF THE PREFERRED EMBODIMENTS

Figure 1:
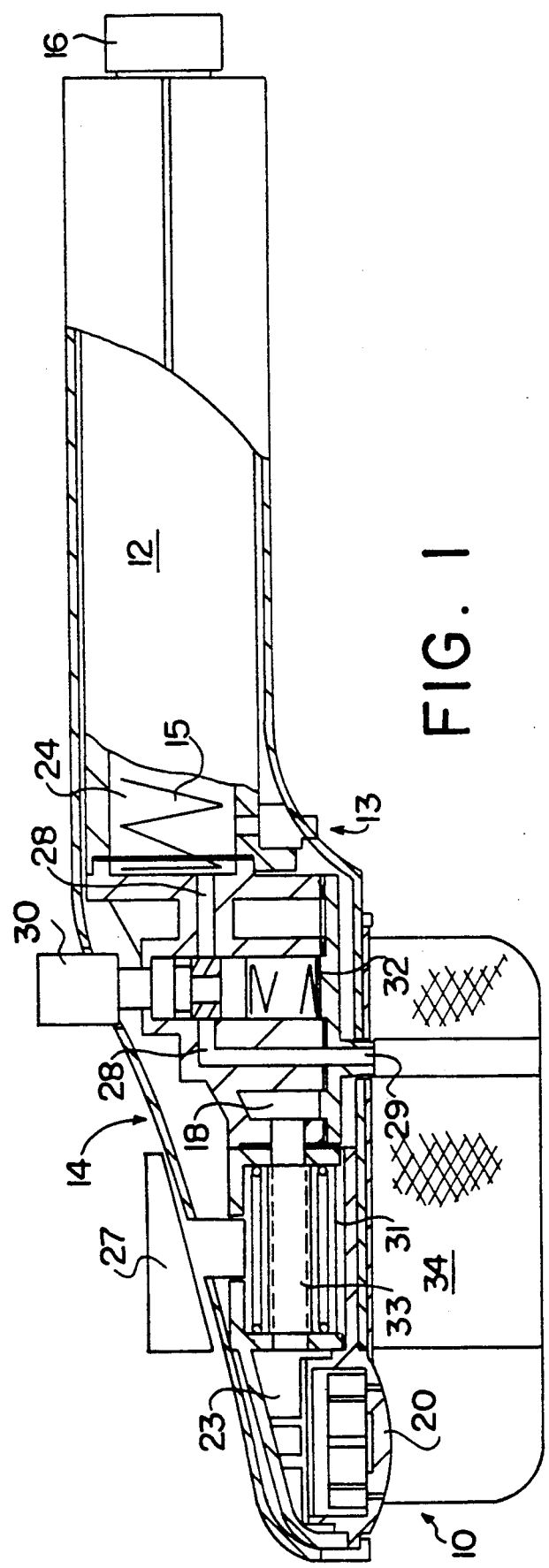
FIG. 1 is a cross-sectional side view of a cleaning apparatus in accordance with the invention.

The cleaning apparatus 10 shown in the drawings is a bath brush which comprises a handle portion 12 and a head portion 14 integral with each other, the handle portion being so dimensionally designed that it can be easily held by the hand of a human being.

The bath brush has a water inlet 16 provided at the outer end of the handle portion through which water passes into the handle portion via a passage 18 and into the head portion 14 and finally out of a plurality of holes provided either as a spray head 20 or as a series of holes 22 on the outer edge of the head portion.

Figure 2:
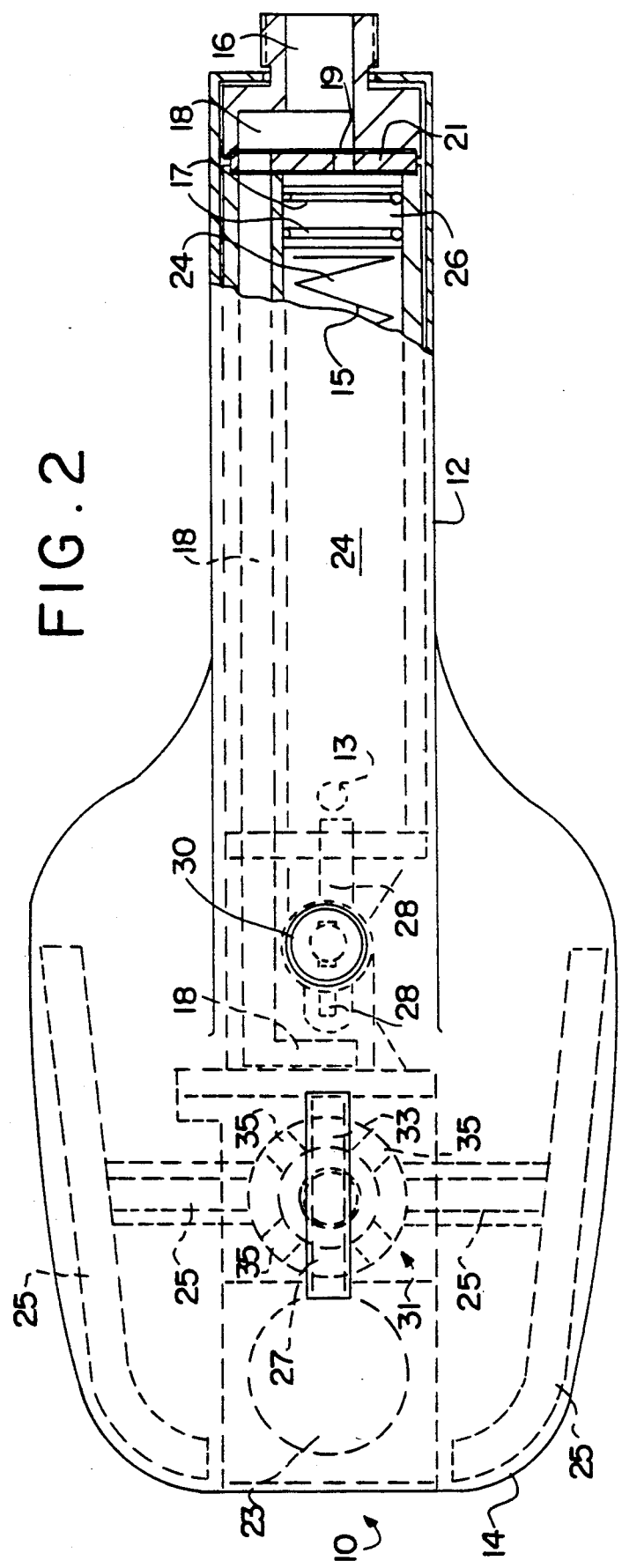
FIG. 2 is a plan view of the cleaning apparatus of FIG. 1 (partly in cross-section)
Figure 3:
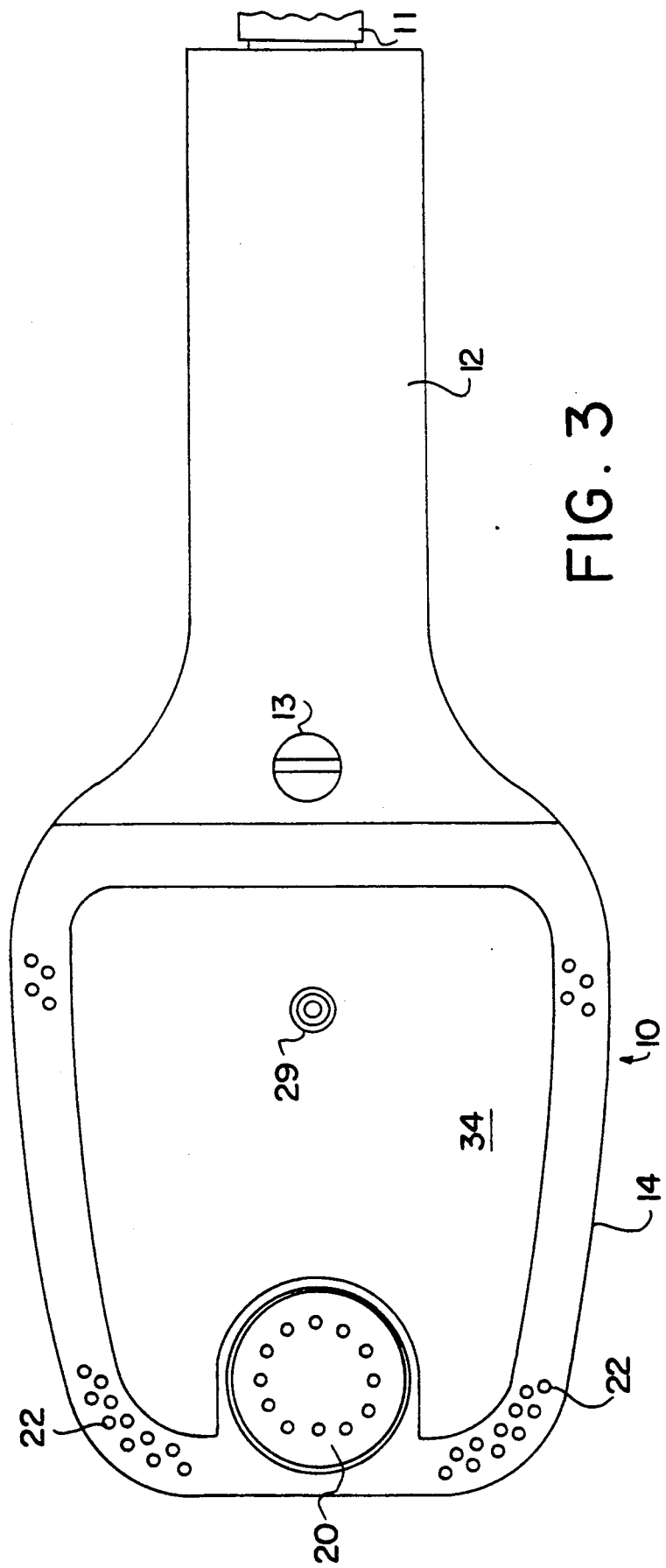
FIG. 3 is an underneath view of the cleaning apparatus of FIG. 1.

In this regard, in FIG. 1 it will be noted that water can pass through from the passage 18 into either the spray head compartment 23 and/or the outer edge holes compartments 25. A rotatable selector member 27 is provided with a connecting passage member 31 in order to optionally turn on or off water to the compartments 23 and 25 (see FIG. 2) which lead to the spray head 20 and outer edge holes 22 respectively (see FIG. 3). The connecting passage member 31 has two series of connecting passages 33 and 35, the passage 33 being a straight through passage to connect the inlet passage 18 to the compartment 23, while the passage 35 (which is offset to the passage 33) is substantially a T-shape in order to connect the inlet passage 18 to the two side compartments 25 when the selector member 27 has been turned to the correct position.

In the handle portion 12 of the bath brush, a compartment 24 is provided for cleaning fluid such as liquid soap or the like. The end wall 21 of the compartment is provided with an inlet 19 through which water can pass into the soap compartment 24 from the inlet 16. A piston member 26 is provided with two seal members 17 whereby the piston member 26 is movable within the compartment 24. One side of this piston 26 acts against the soap provided in the soap compartment 24, while the other side of this piston can be acted upon by water passing through the inlet 16 of the handle portion. Due to the pressure of the water passing through the handle portion and into the passage 18, the piston is forced to act against the contents of the soap within the soap compartment, such that if soap is allowed to run out of the exit passage 28 of the soap compartment, the pressure of the water or the piston member 26 will force soap out of the soap compartment and out of the exit passage 28 to the final soap exit 29 in a cleaning member 34 fixed to the head portion.

In this regard, a plunger member 30 is provided in order to open and close the exit passage 28 of the soap compartment. This plunger is spring biased (see 32) such that when the plunger is released, the plunger is returned to a closed position to prevent any further soap from being released from the soap compartment.

The piston member 26 is also spring biased (see 15) whereby when all the soap in the compartment 24 has been dispensed, a refill entrance 13 is opened and the supply of water to inlet 16 turned off, whereby the soap compartment 24 is depressurized and the spring 15 forces the piston member 26 to return to a position adjacent the end wall 21 of the soap compartment. Thereafter liquid soap can be simply poured into the refill entrance 13 to fill the compartment 24, and refill entrance 13 closed.

The cleaning member on the head of the cleaning apparatus is either a plurality of brush members, or a foam cleaning mass 34, in order that water and soap can be mixed in the cleaning member and used to clean, for instance somebody in the bath.

A similar cleaning apparatus could conceivably also be used with slight modification say to clean a car.

The cleaning apparatus shown in the drawings is simple and effective in that a user can with the press of a plunger member obtain soap which mixes in the cleaning member with water, in order to easily clean a person or a car or the like.

I claim:

1. A cleaning apparatus for use with a source of fluid, comprising:
   a) a hollow, unitary body having a handle portion having a first end for attachment to the source of fluid and a second end;
   b) said body having a cleaning portion integral with and projecting from said second end of said handle portion;
   c) said handle portion having an internal fluid passage communicating between the source of fluid and said cleaning portion;
   d) an internal cleaning fluid compartment disposed within said hollow handle portion for fluid communication with the source of fluid and said cleaning portion;
   e) valve means carried by said handle portion for selectively permitting or preventing fluid communication between said cleaning fluid compartment and said cleaning portion, said means normally preventing said fluid communication:
   f) said internal fluid passage in said handle portion being also in communication with said cleaning fluid compartment, and
   g) pressure means carried by said cleaning fluid compartment for forcing cleaning fluid from said cleaning fluid compartment in response to fluid pressure through said fluid passage in said handle portion.

2. A cleaning apparatus as claimed in claim 1 wherein said pressure means include a piston member within said cleaning fluid compartment for delivering cleaning fluid to said cleaning portion in response to fluid pressure; and said pressure means are normally biased toward said first end of said handle portion.

3. A cleaning apparatus as claimed in claim 1 wherein a spray head is disposed on said cleaning portion in fluid communication with said fluid passage in said handle portion and said cleaning fluid compartment.

4. A cleaning apparatus as claimed in claim 3 wherein said cleaning portion includes a plurality of apertures disposed adjacent its periphery; said apertures are disposed in fluid communication with said fluid passage of said handle portion and said cleaning fluid compartment; and selector means are carried by said cleaning portion for selectively directing fluid to said spray head or said apertures.

5. A cleaning apparatus as claimed in claim 1 wherein said means for selectively permitting or preventing fluid communication between said cleaning fluid compartment and said cleaning portion includes a spring biased member normally preventing such fluid communication.

6. A cleaning apparatus as claimed in claim 1 wherein said cleaning fluid compartment has first and second ends with said first end being disposed adjacent said first end of said handle portion and said second end being disposed adjacent said second end of said handle portion; said pressure means include a spring biased piston disposed within said cleaning fluid compartment and normally urged toward said first end of said cleaning fluid compartment and urged toward said second end thereof by fluid from the source of fluid supply a refill port communicating between the exterior of said handle portion and the interior of said cleaning fluid compartment for filling said compartment when the source of fluid supply has been closed and said piston has moved to said first end of said compartment.

7. A cleaning apparatus for use with a source of water under pressure, comprising:
   a) an elongate hollow body having a hollow handle portion having
      1) a first end attachable to the source of water,
      2) an internal through water passage extending from said first end to a second end and
      3) a radial bore adjacent said second end;
   b) a cleaning portion integral with and projecting from said second end of said handle portion and being in fluid communication with said through water passage thereof;
   c) an internal cleaning fluid compartment disposed within said hollow handle portion and lying parallel to said water passage and having
      1) a first end in fluid communication with the source of water,
      2) a second end selectively in fluid communication with said cleaning portion and
      3) said radial bore communicating with said cleaning fluid compartment adjacent said second end;
   d) a spring loaded piston disposed within said internal cleaning fluid compartment and normally biased toward said first end of said handle portion, past said radial bore but movable toward said second end under pressure from the water to force cleaning fluid from said cleaning fluid compartment into said cleaning portion whereby water or cleaning fluid and water may be supplied to said cleaning portion:
   e) a control valve, carried by said handle portion and normally preventing fluid communication between said cleaning fluid compartment and said cleaning portion;
   f) a cleaning head carried by said cleaning portion and including
      1) a spray head,
      2) a cleaning mass, and
      3) a plurality of through apertures in its periphery; and
   g) selector means carried by said cleaning portion for selectively placing said spray head or said through apertures in fluid communication with the water or the cleaning fluid or both.

* * * * *